Aug. 12, 1941.　　　　　G. VINCKE　　　　　2,252,389
METHOD OF AND MACHINE FOR MAKING RUBBER THREAD
Filed Jan. 22, 1938　　　3 Sheets-Sheet 1
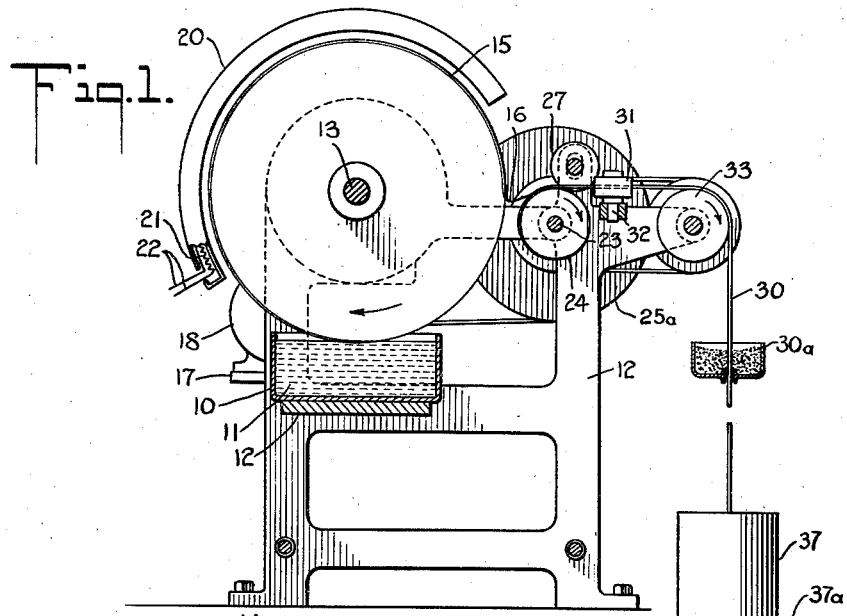
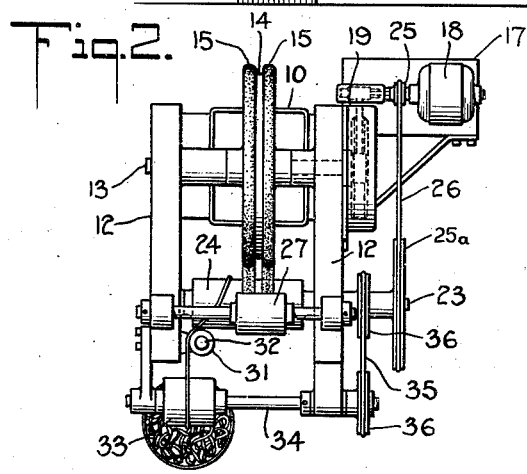
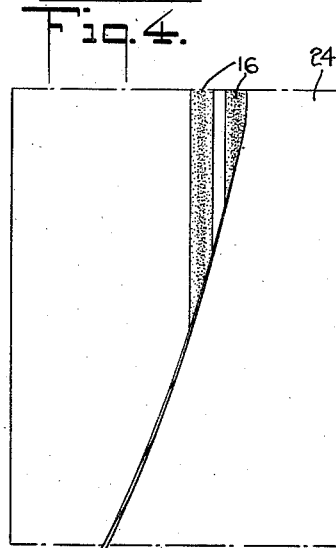
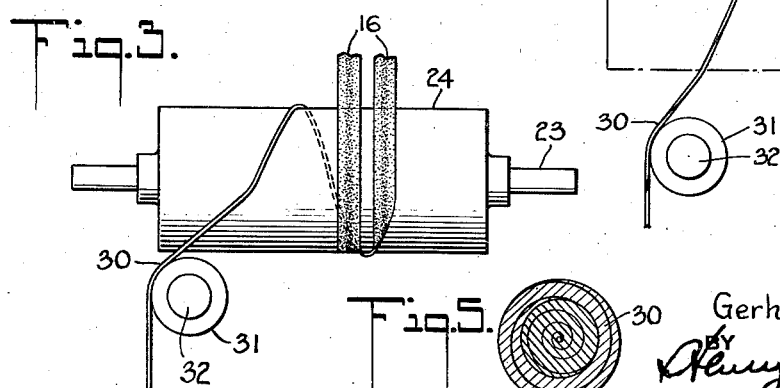
INVENTOR
Gerhard Vincke
BY
HIS ATTORNEY Aug. 12, 1941.   G. VINCKE   2,252,389
METHOD OF AND MACHINE FOR MAKING RUBBER THREAD
Filed Jan. 22, 1938   3 Sheets-Sheet 2

INVENTOR
Gerhard Vincke
BY
Henry J. Lucke
HIS ATTORNEY

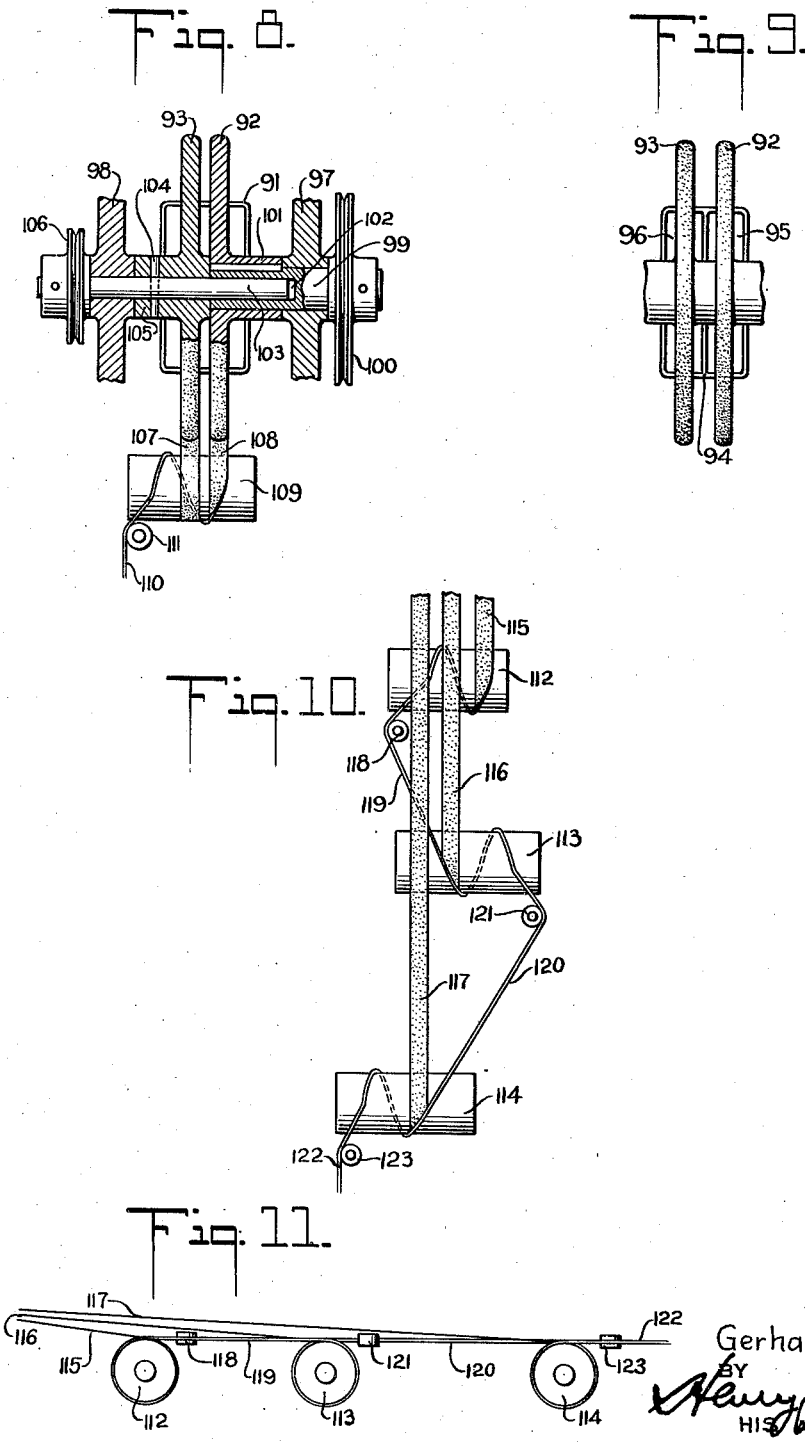

Patented Aug. 12, 1941

2,252,389

UNITED STATES PATENT OFFICE 2,252,389

METHOD OF AND MACHINE FOR MAKING RUBBER THREAD

Gerhard Vincke, New York, N. Y., assignor to Harry H. Straus, New York, N. Y.

Application January 22, 1938, Serial No. 186,275

14 Claims. (Cl. 18—8)

My present invention relates to improved methods of and apparatus for the manufacture of rubber thread from aqueous rubber dispersions and to the articles resulting therefrom.

A feature of the invention is the improved method of making a rubber thread by winding a film of rubber spirally upon itself in a helical path.

A feature of the invention is the method of varying the pitch of the helical path of the film or films in the rolling thereof on itself or on one another to thereby vary the diameter of the resulting thread.

A feature of the invention is the improved method of forming a thread from a film of resilient material while varying the pitch of winding of the film in accordance with the diameter of the thread during the formation thereof.

A feature of the invention is an improved method of making a rubber thread from a plurality of flat films formed from an aqueous rubber dispersion and winding or rolling such films into a homogeneous mass in helical form, and performing the winding or rolling operation thereon while maintaining the films under tension.

A feature of the invention is an improved method of continuously forming rubber thread from a stretched rubber film which lays flat on a roller and in which the rubber film winds or rolls by itself into a round thread by the action of pulling the film laterally from the roller under tension.

A feature of the invention is the improved method of making a rubber thread in which the interior portion has different characteristics than the exterior portion.

A feature of the invention is an improved method of making a thread by winding or rolling a plurality of films of rubber upon each other and in which the innermost film has different characteristics, as respects elasticity and resiliency from the outer layer.

A feature of the invention is an improved method of making a thread from a plurality of films spirally wound one upon the other in a helical path and in which each succeeding film is wound in an opposite direction to the direction of winding of the preceding film.

A further feature of the invention is a novel improved device for manufacturing rubber threads.

In the accompanying drawings:

Fig. 1 is a side elevation partly in section diagrammatically illustrating an apparatus and method of carrying out the present invention;

Fig. 2 is a plan view of the structure shown in Fig. 1 and on a reduced scale.

Fig. 3 is a plan view of the forming roller and illustrating the means and method for removing the bands of rolled rubber or rubber like material therefrom in thread form.

Fig. 4 is a development of the surface of the forming roller illustrated in Fig. 3, and illustrating the manner in which the plurality of rubber bands are wound on in helical form into a single thread cylindrical in cross section.

Fig. 5 is a section through a thread formed according to my present improved method.

Fig. 8 is a sectional plan view partly in elevation of a device forming part of the machine and adapted to produce a plurality of bands at different rates of speed.

Fig. 9 is a plan view illustrating a plurality of pick-up rollers each communicating with a separate latex tank.

Fig. 10 is a schematic layout illustrating a minimum for producing a composite thread from bands of latex or the like in which succeeding layers are rolled into the thread formation in opposite directions, and Fig. 11 is a side elevation of the structure illustrated in Fig. 10.

Figure 6:
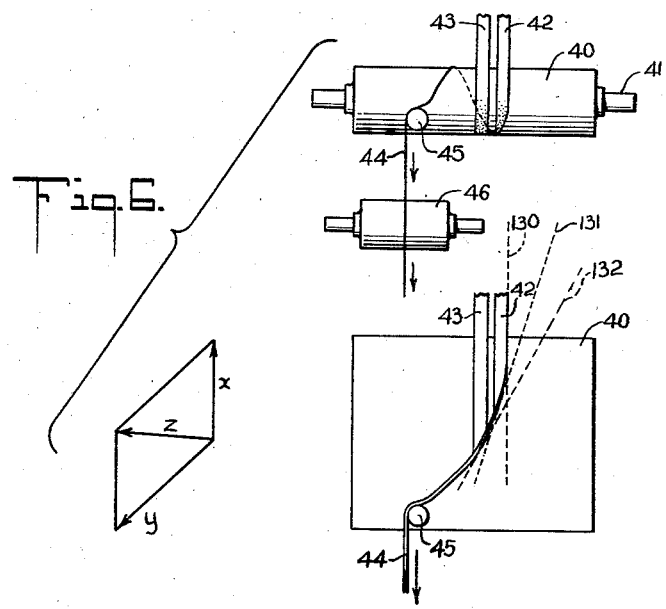
Fig. 6 is a diagrammatic layout illustrating the forces involved in winding or rolling a band or a plurality of bands of rubber or rubber-like material into thread form.

Referring to the drawings, 10 designates a tank for holding liquid material, such as a rubber solution 11, preferably a dispersion of rubber in water, such as natural or concentrated latex which preferably contains the usual curing agents for these dispersions. The tank 10 is mounted on a platform 12 secured between the end members 12 of a suitable framework. Journaled in bearings formed in the frame members 12 is a shaft 13 to which is secured a roller 14 on which is formed the parallelly arranged members 15. The members 15 as they rotate are arranged to dip into the liquid material 11 in the tank 10 to any desired depth and as they rotate a certain proportion of the liquid material 11 will adhere to the surface of the members 15 and will be drawn up therefrom in the form of a film or band 16.

Any suitable means or method may be employed for preventing the formation of scum on the body of liquid material 11 such as latex in the tank 10. Such a means may take the form of a covering for the tank 10 which covers all exposed areas and thereby prevents access of air to the surface of the liquid 11. In place of such a cover a mechanical steering arrangement may be added which constantly agitates the liquid 11 and thereby prevents the formation of scum. If desired, the addition to the liquid 11 of any suitable material, such for example as ammonia, may be utilized to prevent the formation of scum, or the liquid may be kept at a sufficiently low temperature, as by refrigerating means, and thus prevent the formation of scum. Such means for preventing scum also may be utilized in any of the types of apparatus shown in the drawings accompanying the present specification.

Secured to one of the frame members 12 is a bracket 17 and on which is mounted a prime mover such as an electric motor 18 which, through the reduction gearing contained in the casing 19, rotates the shaft 13 and member 14 secured thereto in the direction of arrows shown in Fig. 1 and at any desired surface speed. Partially enclosing the circumference of the members 15 is an arcuate member 20 and which member houses a heating device 21 to which power is supplied through the conductors 22 from any suitable source of power. By means of the heating element 21 the films or bands 16 formed on the members 15 are continuously dried to a tacky condition after their formation and before the removal of such films or bands from the members 15.

At any appropriate point with respect to the circumference of the members 15 and in the frame members 12 is rotatably mounted a shaft 23 and on such shaft is secured a stripping roller 24. The shaft 23 has secured adjacent its outer end a pulley 24 which is in alignment with a pulley 25 on the drive shaft of the motor 18 and a belt 26 extending between the pulleys 24 and 25 causes a rotation of the shaft 23 and therefore the stripping roller 24 in the direction of the arrow shown in Fig. 1.

Journaled in suitable bearings in the frame members 12 is a roller 27 which rests on the stripping roller 24 and is rotated thereby and which roller 27 serves to iron out the films or bands 16 as they are stripped from the members 15. The surface speed of the stripping roller 24 is in excess of the surface speed of the members 15 so that the films or bands 16 are under tension as they are placed upon the stripping roller 24.

The films 16 are lead about the circumference of the roller 24 from which they are withdrawn sideways under tension by a pulley 31. This withdrawing action of the tensioned films causes the winding movement of the film while on the surface of the cylinder, on which they take a helical path of varying pitch, the degree of pitch depending on the angle of withdrawal.

I find it advantageous to employ the roller 31 mounted on a substantially vertical axis 32 secured to one of the frame members 12 and the position of such axis determines the angle of pull of the thread 30 formed from the films or bands 16. The roller 31 is rotatably mounted and is preferably positively rotated in any suitable manner. The roller 31 cooperates with a roller 33 mounted on a shaft 34 rotatably mounted in bearings in the frame members 12 and driven from the shaft 23 in the direction of the arrows shown in Fig. 1 by means of the belt 35 and pulleys 36. The thread 30 passes through a talcing box 30a and is then delivered to a collecting box 37 where it is suitably prepared for subsequent vulcanization, should this be deemed necessary.

The collecting box 37 is preferably situated on the floor below that on which rests the mechanism above described. Such floor on which the collecting box 37 rests is designated by the reference numeral 37a. By thus arranging the talcing box 30a on the floor below there is a sufficient length of finished thread 30 below such talcing box to insure that the weight thereof will be sufficient to cause a proper feed of the finished thread through the talcing box.

Referring now to Fig. 6 there is shown a diagrammatic layout illustrating the forces involved in rolling a plurality of films or bands into a single thread and wherein 40 designates a roller or drum mounted for rotation on a shaft 41 and which in its rotation draws the parallelly arranged bands 42, 43, from a roller on which the same is deposited, as for example, in the manner illustrated in Fig. 1. As the drum 40 rotates, the bands 42 and 43 are lead in a helical path around the roller 40 and in such movement the bands 42 and 43 are rolled together with the band 42 on the inside. That is, such band 42, when rolled up, will be enclosed by the band 43. The resulting thread 44 is removed from the roller 40 by being passed around a driven roller 45, and by means of the drum 46 the completed thread 44 is moved in the direction of the arrow shown.

In the lower righthand portion of Fig. 6 is illustrated a development of the drum 40 and illustrates clearly the manner in which the bands 42 and 43 are rolled together into a unitary structure resulting in the thread 44.

The tendency of the bands 42 and 43 to roll together is illustrated at the lower lefthand side of Fig. 6, where X represents the component developed by the tension or pull on the bands 42 and 43 from the device on which the same were made, while Y represents the component due to the pull exerted on the bands 42 and 43 by the force on the completed thread 44. The resultant of X and Y is designated by the line Z which represents the force that pulls the thread sideways and causes it to roll due to the adhesion of the rubber band to the curved surface of the roll.

The pitch of the helical path at which the film or band is rolled into a thread varies gradually for each cross-sectional point of the band. At the start of the rolling point the pitch is almost infinite and then as the thread builds up and increases in diameter the pitch becomes correspondingly smaller and smaller so that for each diameter the thread winds up at its corresponding pitch, resulting in a balanced thread. That is, considering the longitudinal axis 130 of the film or band 42 (see Fig. 6) it will be noted that adjacent the righthand edge of the film or band 42 the angle of wind is the angle included between the longitudinal axis 130 and the line 131. As the other or lefthand side of the film or band 42 is approached the angle of wind is increased so that as the lefthand edge of the film or band 42 is approached this angle increases so that, as the lefthand edge of the film or band 42 is reached the angle is that included between the axis 130 and the line 132. The film or band 42 therefore is helically wound upon itself and each turn of the winding lies practically flat upon the preceding turn. There results therefore a thread in which all parts are under substantially the same tension.

Figure 7:
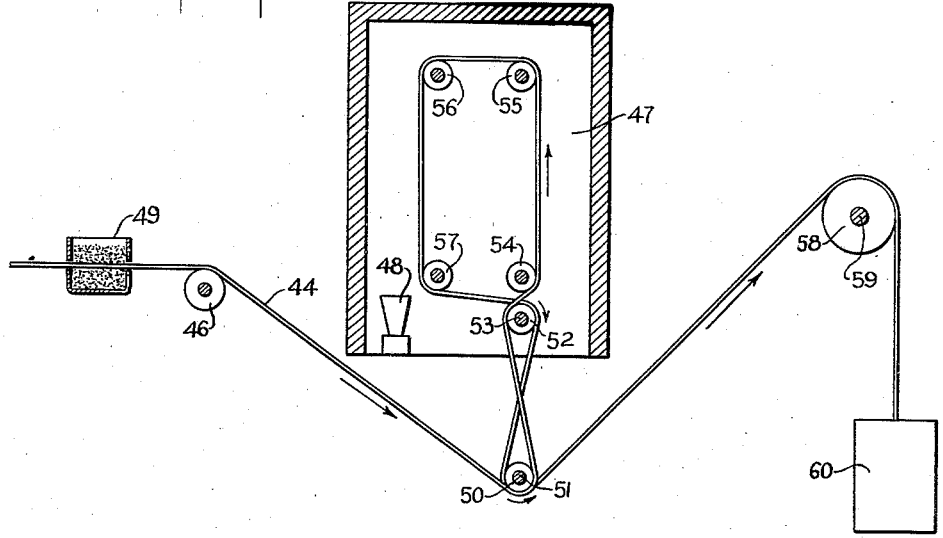
Fig. 7 is a sectional elevation of a vulcanizing chamber with the mechanism involved in carrying an unvulcanized thread from the point of making the same into and through the vulcanizing chamber to any suitable collecting depot.

As the thread 44 is preferably made of rubber or rubber-like material which is unvulcanized and therefore in practically a raw state I may utilize the apparatus shown in Fig. 7 for the purpose of passing such thread 44 through a vulcanizer, as through the vulcanizing chamber 47, heated by any suitable heater, as the heat element 48. Preferably I pass the thread 44 as the same is traveled over the drum 46 through a magazine or box 49 for the purpose of coating the outer surface of the thread 44 with a suitable powder, as talcum powder. Such thread 44 passes downwardly in the direction of the arrow shown over a pulley 50 which is rotatably mounted on a shaft 53, and thence the thread follows the path of the arrow over the rotatably mounted pulleys 54, 55, 56 and 57 and thence over a pulley rotatably mounted on the shaft 53, and which pulley is not shown because of its location behind the pulley 52. The thread then passes downwardly and under a pulley, also not shown because of its location behind the pulley 50 on the shaft 51, and passes upwardly in the direction of the arrow shown over a pulley 58 rotatably mounted on the shaft 59. The thread is then lead downwardly into any suitable collecting receptacle 60.

While the pulleys 54 to 57 inclusive are rotatably mounted, they are preferably secured to their respective shafts and the shafts are positively driven in unison to thereby determine the rate of speed of the thread 44 through the vulcanizing chamber 47. In this manner the vulcanizing may be determined with certainty. Also by properly connecting the driving mechanism of the shafts of said pulleys to the mechanism for operating the heater 48 the duration of the vulcanization period may be varied in accordance with the temperature within the chamber 47.

The films or bands 16, as shown in Figs. 1, 2, and 3 or the films or bands 42 as shown in Fig. 6, may be identical in character, both as regards width and thickness as well as regards physical characteristics, and by properly varying the physical characteristics of the material of which such films or bands are composed, it is feasible and within the scope of my invention to make therefrom a composite thread, as the thread 30 as shown in Figs. 3 and 4, or the thread 44 as shown in Fig. 6 and in which the interior thereof is of a distinctly different character than the exterior thereof. For example, the films or bands 42 and the right hand film or band 16 as shown in Fig. 3 may be considerably harder in character than the film or band 43 as shown in Fig. 6, or the left hand film or band 16 as shown in Fig. 3, and the result therefore is a composite thread which has a relatively hard inner portion or core, and a relatively soft or more elastic outer portion or covering.

Referring now to Figs. 8 and 9, there is shown in Fig. 8, for example, a tank 91 adapted to contain liquid material such as latex and into which the peripheral edges of the wheels 92 and 93 dip, in the same manner as the wheels 15 dip into the tank 10 as shown in Fig. 1. In Fig. 9 is shown a tank 94 divided into a plurality of compartments 95 and 96 respectively and into which compartments dip the peripheral edges of the wheels 92 and 93 respectively.

The wheels 92 and 93, as shown in Fig. 8, are designed to rotate at different speeds and for this purpose there is shown the bearing members 97 and 98 of the framework 12 of the machine. In the bearing 97 is rotatably mounted a shaft 99 which has secured thereto a grooved pulley 100 over which runs a belt (not shown) for rotating the shaft 99 by suitable connecting means from the prime mover 18 shown in Fig. 2. Keyed to the shaft 99 is a collar 101 which has formed integral therewith, in the present instance, the wheel 92 and therefore the wheel 92 has a peripheral speed determined by the speed of the prime mover 18 and the size of the grooved pulley 100.

The shaft 99 is bored as indicated by the reference numeral 102 to receive as a rotating fit a shaft 103 and which shaft also is rotatably mounted in the bearing 98. Secured to the shaft 103 by pin 104 is a collar 105. Formed integral with said collar is the wheel 93. The wheels 92 and 93 are of the same external diameter. Secured to the shaft 103 is a groove pulley 106 adapted to be driven by a suitable belting connection from the prime mover 18.

The diameter of the grooved pulley 106 in the present instance, is considerably less than the diameter of the grooved pulley 100 and therefore the peripheral speed of the wheel 93 is measurably greater than the peripheral speed of the wheel 92. It results therefore that the film or band 107 of latex is made faster than the band 108 of latex. It follows therefore that the film or band 107 of latex is delivered to the stripping roller 109 under less tension than is the band 108 of latex.

Therefore in the manufacture of the rubber thread 110 which is drawn off from the roller 109 over the roller 111, that portion of the thread made from the band 108 is rolled under a higher tension than is the outer layer thereof and which outer layer is composed of the band 107. As a matter of fact, it is possible to lay the band 107 on the rolled up band 108 with but very little tension whatever existing therein. There results therefore a composite thread in which, while the films or bands of latex have the same characteristic, the resulting thread has an inner or core portion which has different physical characteristics than the outer or cover portion.

Referring now to Fig. 9 the wheels 92 and 93 dip respectively into the compartments 95 and 96 of the tank 94 and in which compartments may be latex or other rubber or rubber-like composition or solution, and in which the materials in each of the tanks or compartments have widely varying characteristics. By this means it is possible to utilize the method of making a thread illustrated in Fig. 8 and preceding figures and it will be apparent that a composite thread having practically any desired characteristics may be produced by the use of my apparatus and by practicing my improved method.

Another method of making an elastic thread according to my present invention, comprises utilizing a plurality of bands and helically winding the same and wherein the succeeding band of a plurality of bands is helically wound upon a preceding band and with the lay of the helical winding of such succeeding band in the opposite direction to the lay of the helical winding of the preceding band. A structure by means of which this improved method may be carried out is illustrated in Figs. 10 and 11 where 112, 113 and 114 designate respectively the rollers over which the bands 115, 116, and 117 are drawn from the band making device. The roller 112 receives the band of latex or other rubber or rubber-like material 115, and such band is wound upon itself in a helical lay, and the resulting thread 119 is drawn off from the roller 112 over the idler roller 118. From such roller 118 the thread 119 is led over the roller 113 where it combines with and has laid thereon in a helical lay the band 116, and such band 116 will be laid on the thread 119 in a direction opposite to the lay of the thread 119. The resulting thread designated by the numeral 120 is drawn from the roll 113 over the idler roll 121 and is laid onto the roll 114, where it is combined with the band 117 of latex or other rubber or rubber-like composition, and such band 117 is laid onto the thread 119 in a direction opposite to the lay of the band 116. The resulting composite thread 122 is drawn from the roll 114 over the roll 123.

Whereas I have described my invention by specific reference to forms thereof, it will be understood that many changes and modifications may be made without departing from the spirit of the invention.

I claim:

1. That improved method of forming a thread substantially cylindrical in cross-section from a film or band, which consists in leading such band under tension and in a helical path along a constantly rotating roller, and withdrawing such band laterally of and at an angle to a plane perpendicular to the axis of rotation of the roller while maintaining the same under tension to thereby cause the band to roll by itself under the effect of its stresses upon itself in a helical form and spiral lay.

2. That improved method of forming a thread substantially cylindrical in cross-section from a plurality of films, which consists in leading such films under tension and parallel to each other around a constantly rotating roller, and withdrawing such films laterally of and at an angle to a plane perpendicular to the axis of rotation of the roller while maintaining the films under tension to thereby cause the films to roll spirally upon each other in helical form.

3. That improved method of forming a thread of resilient material, which comprises forming a film from the material, tensioning the film in the direction of its length, leading the same onto a surface to maintain the film in the tensioned condition, and withdrawing said film under tension from the surface laterally of the direction of length of the film whereby the film rolls upon itself in a spiral lay and helical path.

4. As an improved article of manufacture a thread made from a plurality of films of rubber wound together under tension, one of the films being rolled spirally upon the other or others and in which the tension of the outer film is less than the tension in the inner film or films.

5. As an improved article of manufacture a thread of rubber made from a plurality of films of rubber spirally wound upon each other and in which one of the films is wound under greater tension than the others.

6. As an improved article of manufacture a thread made from a plurality of films of rubber, the material of the different films having different characteristics and said films being rolled spirally one upon another into a homogeneous thread.

7. As an improved article of manufacture a thread of rubber made from a plurality of films of rubber, the material of the different films having different characteristics and said films being rolled spirally one upon another into a homogeneous thread and with the tension in the outer film less than the tension in the inner film.

8. That improved method of forming a thread of resilient material, which comprises forming a band from the material, tensioning the band in the direction of its length, placing the same on a surface to maintain the band in the tensioned condition, withdrawing said band from the surface laterally of the direction of length of the band and under tension, whereby the band is rolled upon itself in a spiral lay and helical path, and then vulcanizing.

9. That improved method of forming a thread from a liquid containing rubber, which comprises continuously forming a film from the liquid material, primarily drying the film thus formed to a tacky condition, placing the film under tension and leading the film onto and in engagement with a rotating roller, and withdrawing the film laterally and under tension from the rotating roller at an angle to a plane perpendicular to the axis of rotation of such roller, to thereby cause a winding upon itself of the film in a helical path and spiral lay.

10. That improved method of forming a thread substantially cylindrical in cross section from a film, which consists in leading such film under tension around a constantly rotating cylinder, and withdrawing such film laterally of and at an angle to a plane perpendicular to the axis of rotation of the cylinder, while maintaining the film under tension to thereby cause it to roll by itself sidewise on the surface of the cylinder under the effect of its internal stresses.

11. As an improved article of manufacture, a thread of rubber composed of a film of rubber spirally wound upon itself in a helical path in one direction and enclosed by a film of rubber spirally wound upon itself in a helical path in the opposite direction.

12. In a machine for making threads from a film of rubber, the combination of a rotatable stripping cylinder adapted to receive a film of rubber on its surface under tension, means for withdrawing the film laterally in thread form from the stripping cylinder, and means for driving the stripping cylinder and said last-named means at substantially the same speed.

13. In a machine for making threads from a film of rubber, the combination of a tank for holding the rubber in liquid form, a forming wheel, the forming wheel having a portion of its periphery dipping into the liquid within the tank, a first stripping roller, positioned with its axis substantially parallel to the axis of the forming wheel, means for rotating the first stripping roller and forming wheel in the same direction and for rotating the first stripping roller at a greater surface speed than the surface speed of the forming wheel, conditioning means partially encircling the periphery of the forming wheel to condition the film formed on the forming wheel as the same rotates and prior to being stripped therefrom from the first stripping roller, a second stripping roller positioned with its axis at an angle to the first stripping roller, means for rotating the second stripping roller at a greater surface speed than the surface speed of the first stripping roller, whereby the second stripping roller withdraws the finished thread to one side of the axis of rotation of the first stripping roller under tension, and causes the film to roll upon itself in helical form and spiral lay under the effect of the stretching stresses.

14. In a machine for making a thread of rubber substantially cylindrical in cross-section from a plurality of films of rubber, which comprises in combination, a tank for holding the rubber in liquid form, a plurality of parallelly arranged wheels each having a portion of its periphery dipping into the liquid rubber within the tank, means for rotating said wheels to thereby cause a film of rubber to be deposited on the face of each of these wheels continuously as the same rotate, means for conditioning the films to tacky condition, a stripping roller mounted parallel to the wheels and rotating at a greater surface speed than the surface speed of the wheels, whereby the films are stripped from the wheels under tension and wound on the stripping roller, and means for causing the films to roll into a thread on the roller, and for withdrawing the thread from the roller, which comprises an element positioned to withdraw the formed thread under tension at an angle to a plane lying perpendicular to the axis of rotation of the stripping roller.

GERHARD VINCKE.